United States Patent
Garrett

(10) Patent No.: US 11,187,297 B2
(45) Date of Patent: Nov. 30, 2021

(54) VEHICLE STRUT ASSEMBLY

(71) Applicant: Nissan North America, Inc., Franklin, TN (US)

(72) Inventor: Daniel Garrett, Detroit, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 180 days.

(21) Appl. No.: 15/923,553

(22) Filed: Mar. 16, 2018

(65) Prior Publication Data

US 2019/0285131 A1 Sep. 19, 2019

(51) Int. Cl.
*F16F 9/38* (2006.01)
*B60G 15/06* (2006.01)
*F16F 13/00* (2006.01)

(52) U.S. Cl.
CPC .............. *F16F 9/38* (2013.01); *B60G 15/063* (2013.01); *F16F 13/005* (2013.01); *B60G 2200/1424* (2013.01); *B60G 2202/12* (2013.01); *B60G 2202/312* (2013.01); *B60G 2204/12422* (2013.01); *F16F 2230/105* (2013.01); *F16F 2230/16* (2013.01)

(58) Field of Classification Search
CPC .... B60G 15/063; B60G 15/068; B60G 15/07; B60G 17/021; B60G 2204/12422; B60G 2204/1242; B60G 2204/418; B60G 2202/12; B60G 2202/312; F16F 13/005; F16F 9/38; F16F 1/12; F16F 3/04; F16F 2230/16; F16F 2230/105
USPC ............ 188/266, 283, 322.11; 267/220, 170, 267/221; 280/124.154, 124.145, 124.147
See application file for complete search history.

(56) References Cited

U.S. PATENT DOCUMENTS

| | | | | |
|---|---|---|---|---|
| 6,007,061 | A * | 12/1999 | Kammel | B60G 15/068 188/321.11 |
| 2004/0168870 | A1* | 9/2004 | Handke | B60G 15/068 188/321.11 |
| 2005/0063630 | A1* | 3/2005 | Handke | F16F 9/38 384/617 |

(Continued)

FOREIGN PATENT DOCUMENTS

DE 102009057516 A1 7/2010

OTHER PUBLICATIONS

Photo of a strut and boot from a 2015 Chrysler 300.

*Primary Examiner* — Robert A. Siconolfi
*Assistant Examiner* — San M Aung
(74) *Attorney, Agent, or Firm* — Global IP Counselors, LLP

(57) ABSTRACT

A vehicle strut assembly includes a boot and a coil spring. The boot has a vertical wall, a spring receiving portion and a centering portion projecting from the vertical wall. The coil spring has an end section, a transition section and a main section, the end section being fitted to the spring receiving portion encircling at least a portion of the vertical wall and defining a first radially inner diameter. The transition section has an increasing inner diameter extending from the end section to the main section. The main section defines a second radially inner diameter greater than the first radially inner diameter. The centering portion is positioned to contact a radially inner surface of the transition section of the coil spring restricting movement of the end section of the coil spring relative to the spring receiving portion of the boot.

18 Claims, 8 Drawing Sheets

(56) References Cited

U.S. PATENT DOCUMENTS

| | | |
|---|---|---|
| 2006/0076751 A1 | 4/2006 | Kumura |
| 2006/0082037 A1* | 4/2006 | Al-Dahhan ............ B60G 11/54 |
| | | 267/179 |
| 2007/0170684 A1* | 7/2007 | Ohkita ................. B60G 15/063 |
| | | 280/124.147 |
| 2011/0120822 A1* | 5/2011 | Kondou .................... F16F 9/54 |
| | | 188/269 |
| 2014/0239567 A1* | 8/2014 | Suchta ................. B60G 15/061 |
| | | 267/220 |

* cited by examiner

VEHICLE STRUT ASSEMBLY

BACKGROUND

Field of the Invention

The present invention generally relates to a vehicle strut assembly. More specifically, the present invention relates to vehicle strut assembly that includes a boot with a coil spring centering structure.

Background Information

The strut assemblies at the front end of a vehicle are designed and configured to withstand a variety of forces acting there on. For example, strut assemblies are part of both suspension and steering systems. A shock absorber within the strut assembly absorbs impact energy experienced by its corresponding vehicle wheel where the impact energy is caused by the wheel passing over, for example, a bumpy road, a pot hole, or other rough road and off-road surfaces.

SUMMARY

One object of the present disclosure is to provide a boot that protects a shock absorber in a strut assembly with surfaces that maintain an upper end of a coil spring in a centered orientation relative to the boot and the shock absorber.

In view of the state of the known technology, one aspect of the present disclosure is to provide a strut assembly with a boot and a coil spring. The boot has a vertical wall, a spring receiving portion at least partially defined by the vertical wall, and a centering portion projecting from the spring receiving portion. The coil spring has an end section, a transition section and a main section. The end section is fitted to the spring receiving portion encircling at least a portion of the vertical wall and defining a first radially inner diameter. The transition section has an increasing inner diameter extending from the end section to the main section. The main section defines a second radially inner diameter greater than the first radially inner diameter. The centering portion is positioned to contact a radially inner surface of the transition section of the coil spring restricting movement of the end section of the coil spring relative to the spring receiving portion of the boot.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
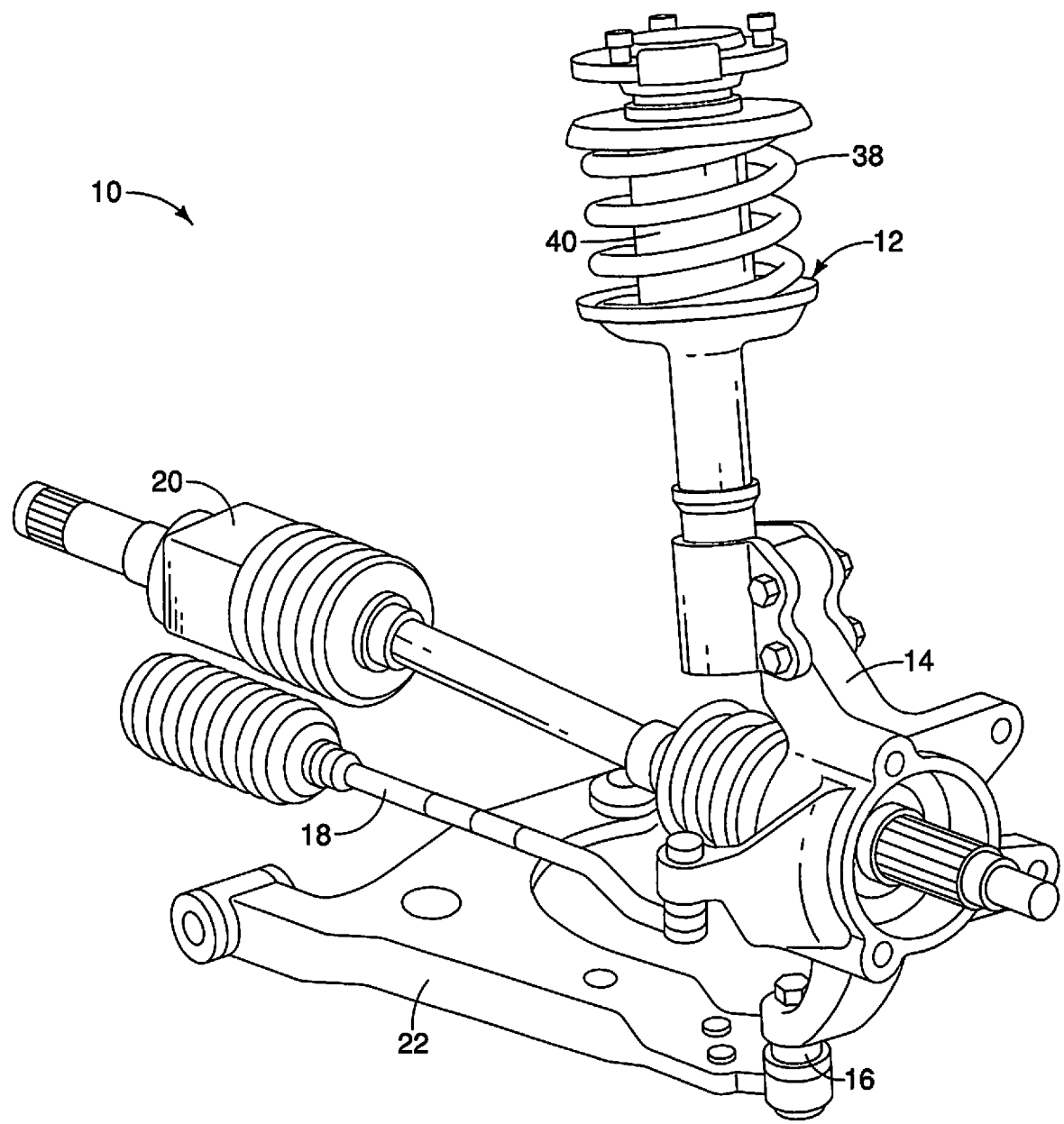
FIG. 1 is a perspective image of a vehicle strut assembly showing a boot and a coil spring in accordance with a first embodiment.

Referring initially to FIG. 1, a front-end suspension assembly 10 including a strut assembly 12 of a vehicle (not shown) is illustrated in accordance with a first embodiment.

The front-end assembly 10 is shown removed from the vehicle (not shown) and includes a steering knuckle 14, a ball joint 16 that pivotally supports the steering knuckle 14, a tie rod 18, a constant velocity shaft assembly 20 (also referred to as a CV half-shaft assembly 20), a lower control arm 22 and the strut assembly 12. Since vehicle front-end suspension assembly components, such as steering knuckles, ball joints, tie rods, CV half-shaft assemblies and lower control arms are conventional vehicle suspension components, further description is omitted for the sake of brevity.

Figure 2:
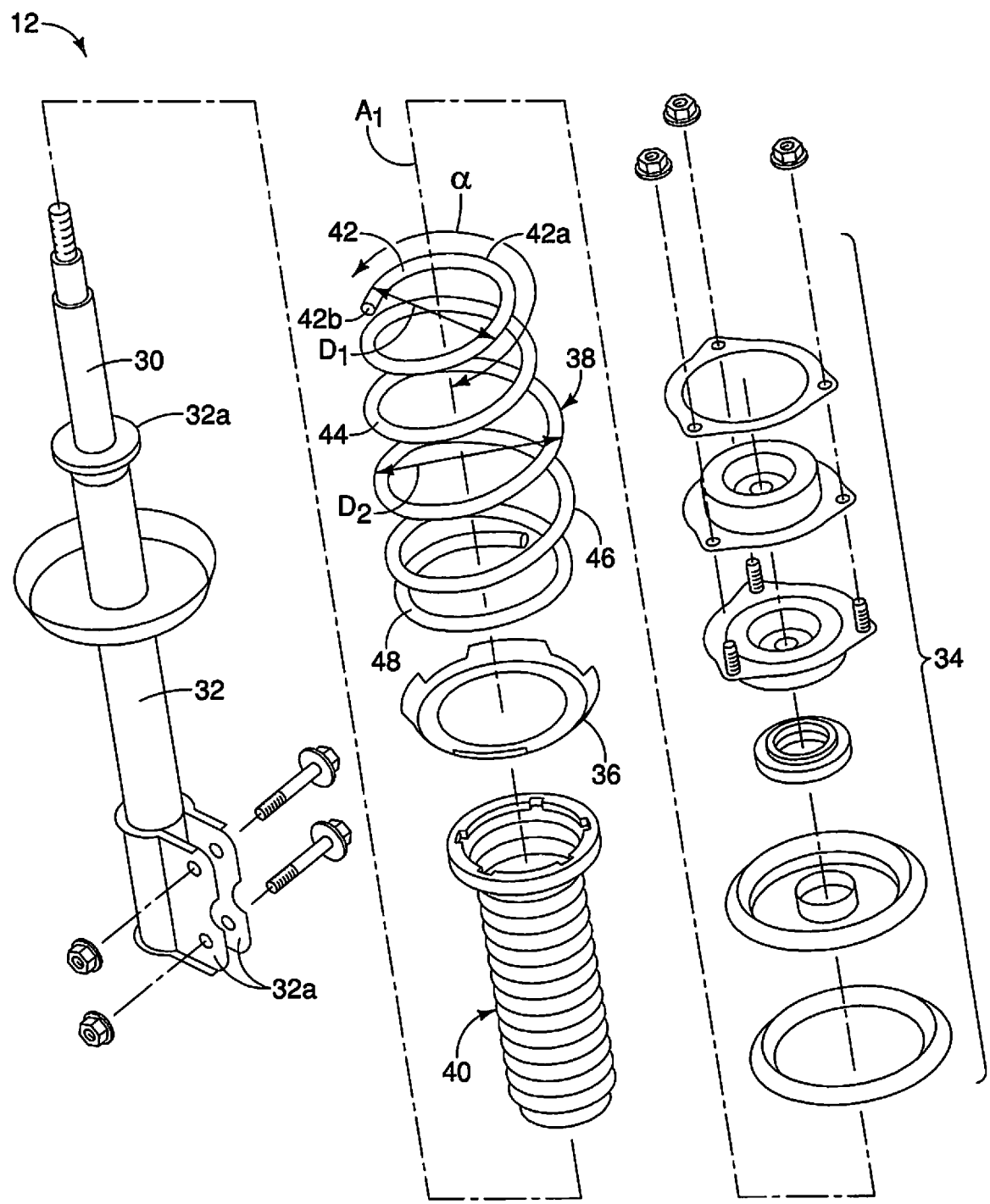
FIG. 2 is an exploded perspective image of the vehicle strut assembly showing shock absorber, the boot and the coil spring in accordance with the first embodiment.
Figure 3:
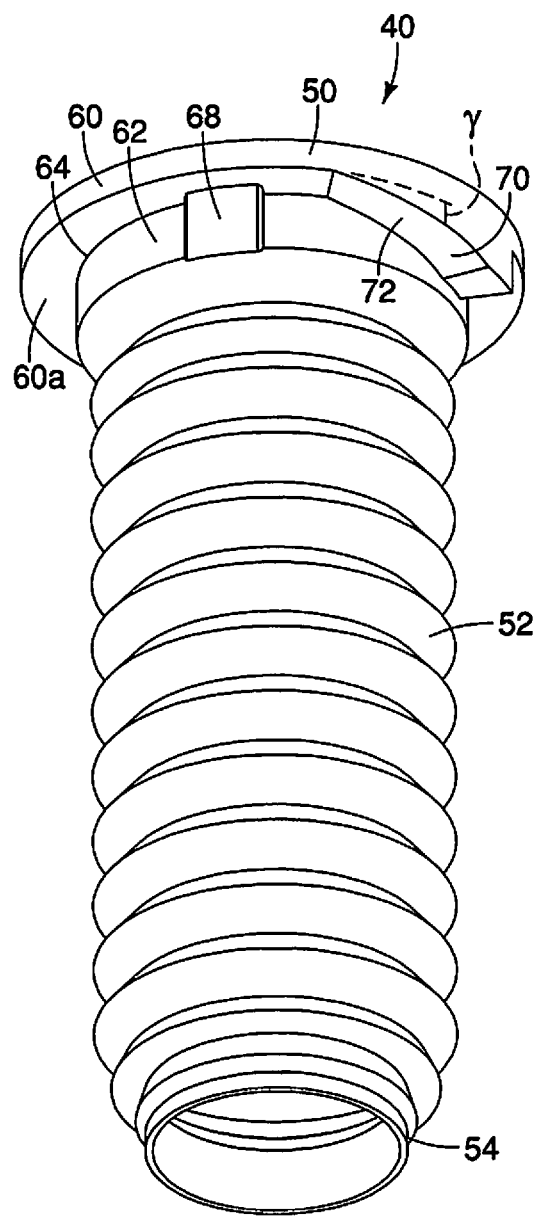
FIG. 3 is a perspective view of the boot removed from the strut assembly showing an upper end, an extending section and a bottom end, the upper end having an annular section and a vertical wall that include a centering portion and a ramp portion in accordance with the first embodiment.
Figure 4:
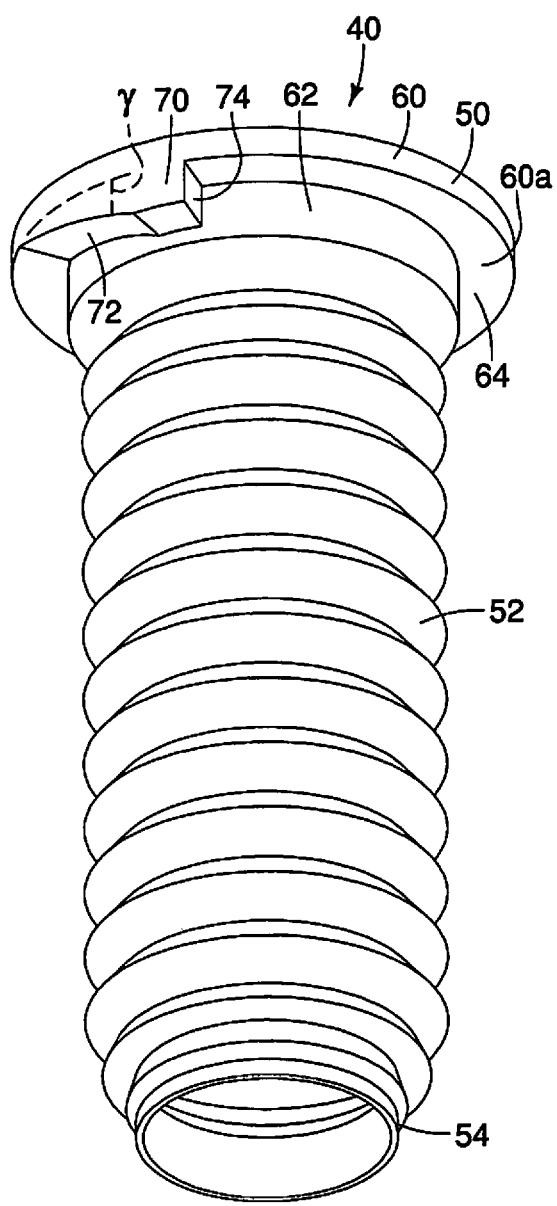
FIG. 4 is another perspective view of the boot showing another side of the boot and, in particular, showing details of the ramp portion in accordance with the first embodiment.
Figure 5:
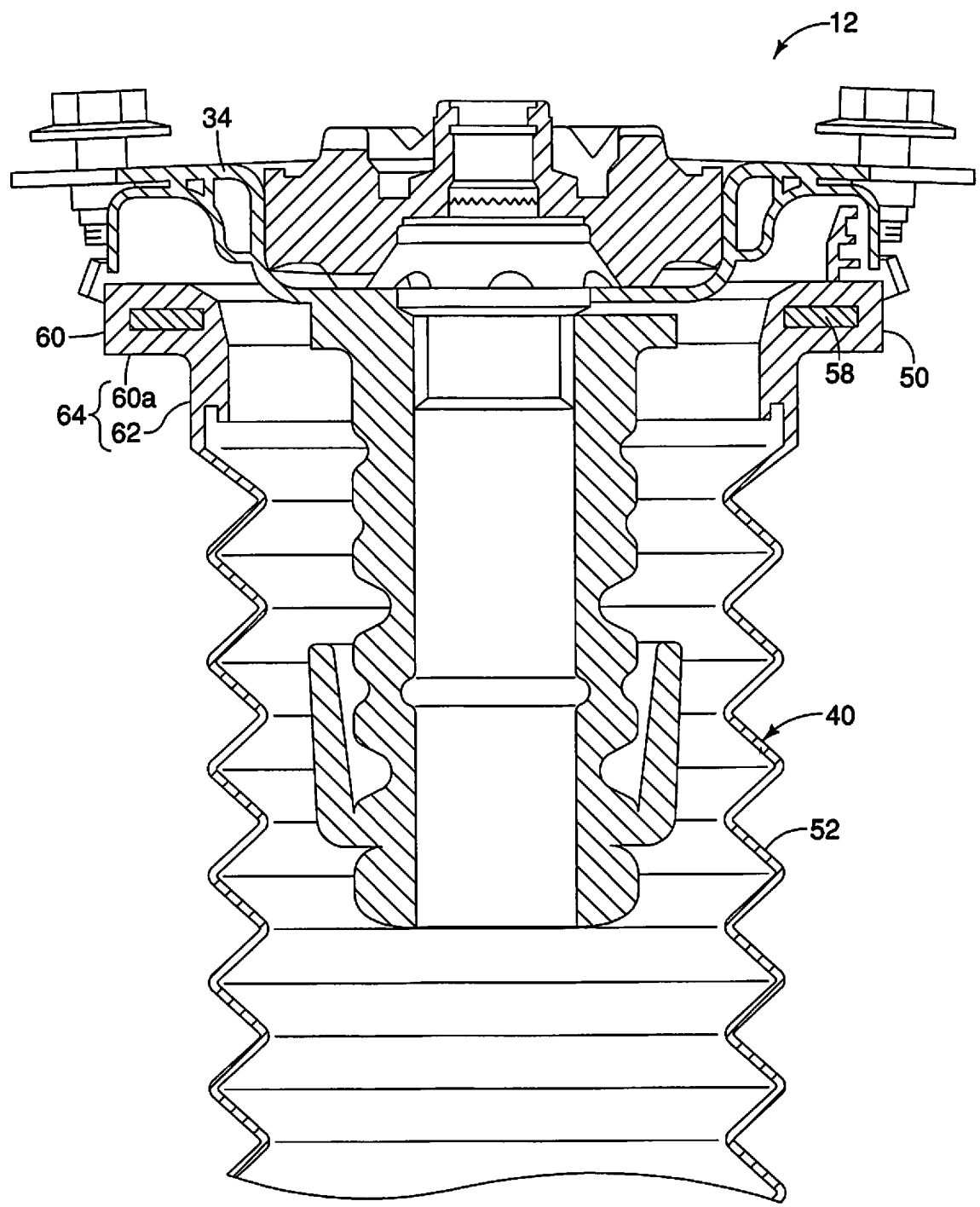
FIG. 5 is a cross-section of the upper end of the boot showing details of an annular surface of the annular section and a spring receiving portion defined by the annular surface and the vertical wall in accordance with the first embodiment.
Figure 6:
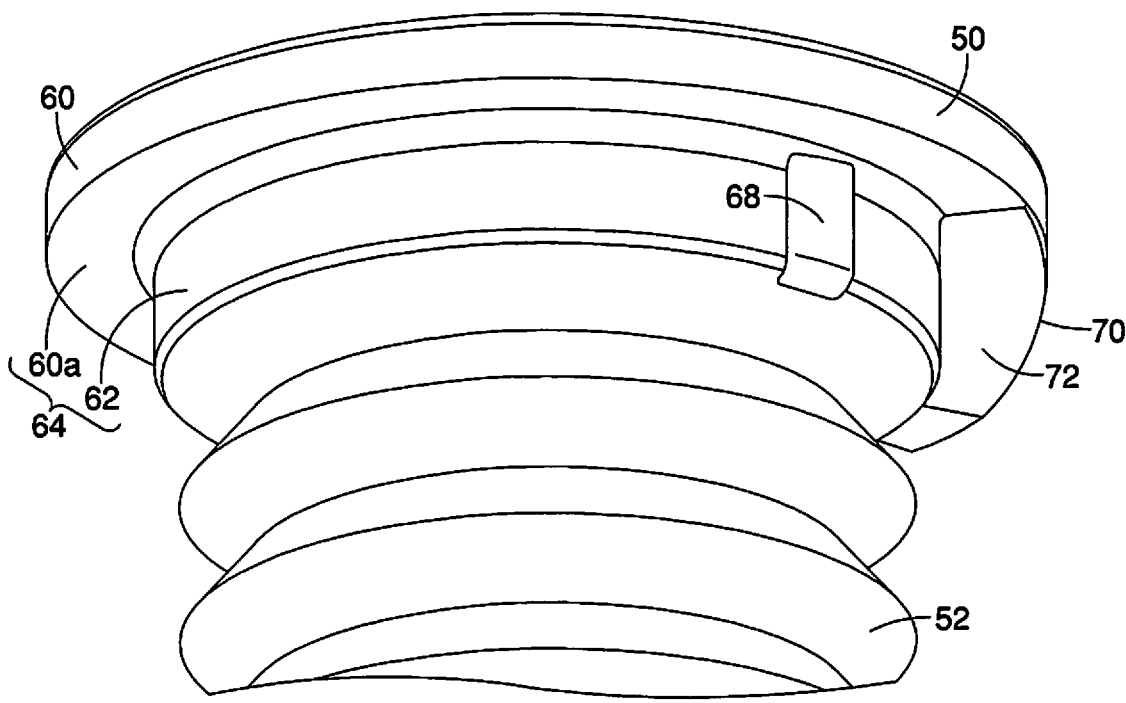
FIG. 6 is a perspective view of the upper portion of the boot showing details of the centering portion along the spring receiving portion in accordance with the first embodiment.
Figure 7:
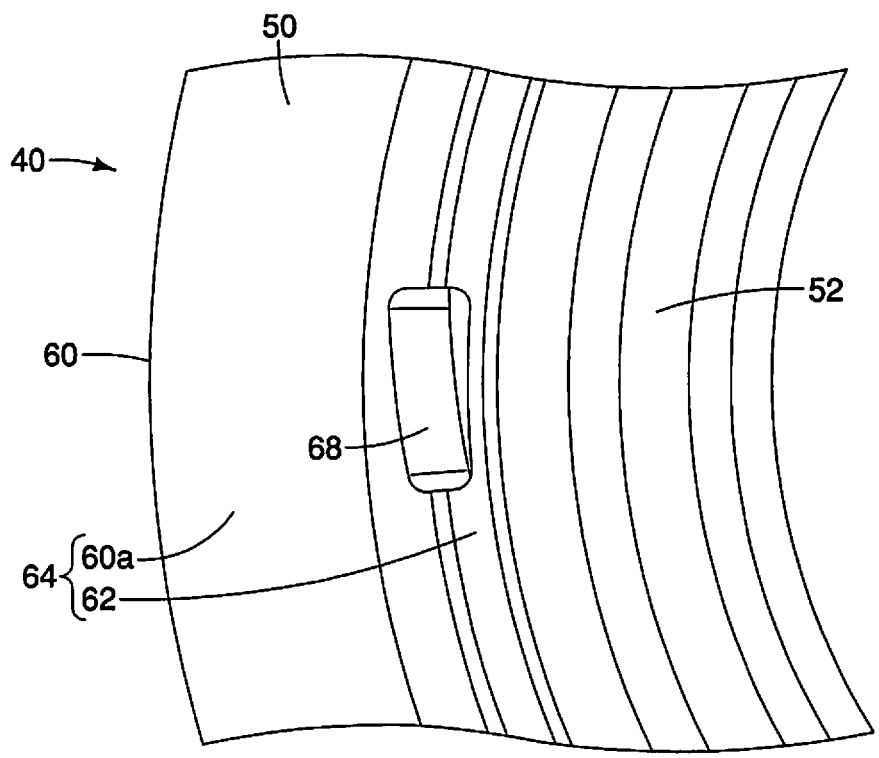
FIG. 7 is a bottom view showing the annular surface of the annular section, and the centering portion along the vertical wall in accordance with the first embodiment.
Figure 8:
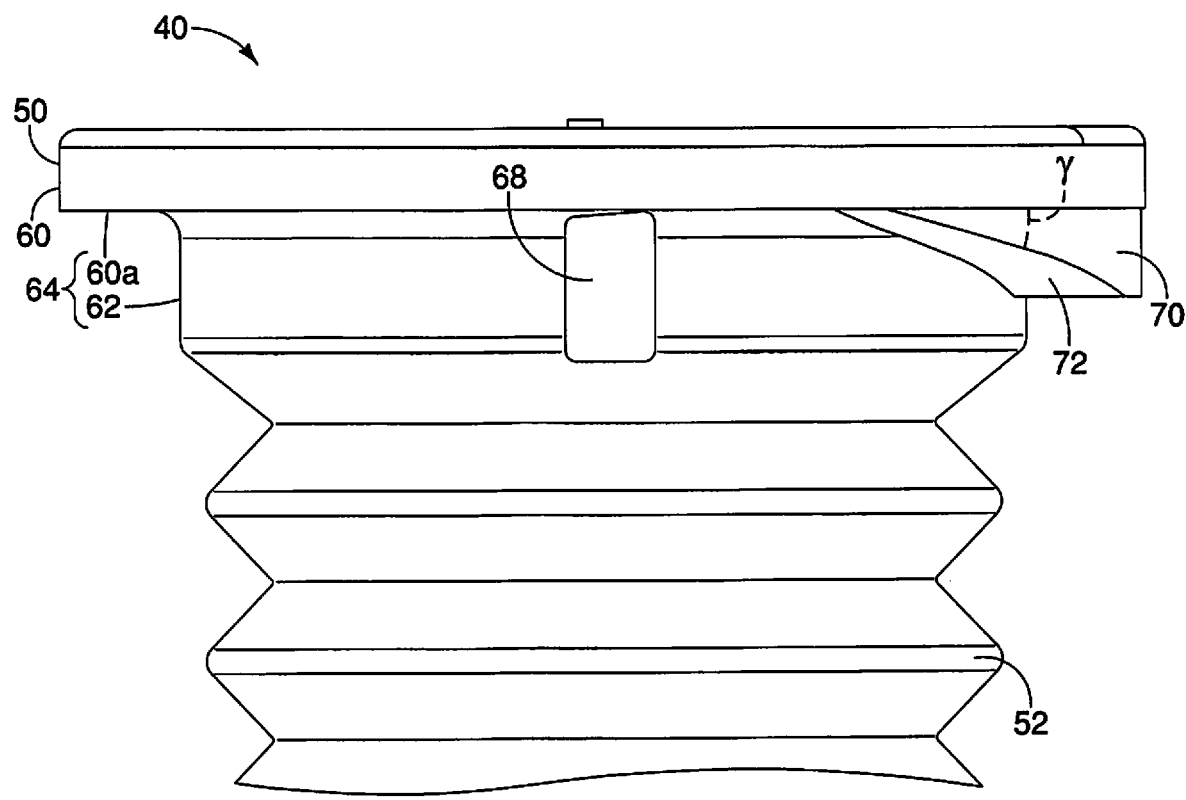
FIG. 8 is side view showing the vertical wall and the centering portion along the vertical wall in accordance with the first embodiment.
Figure 9:
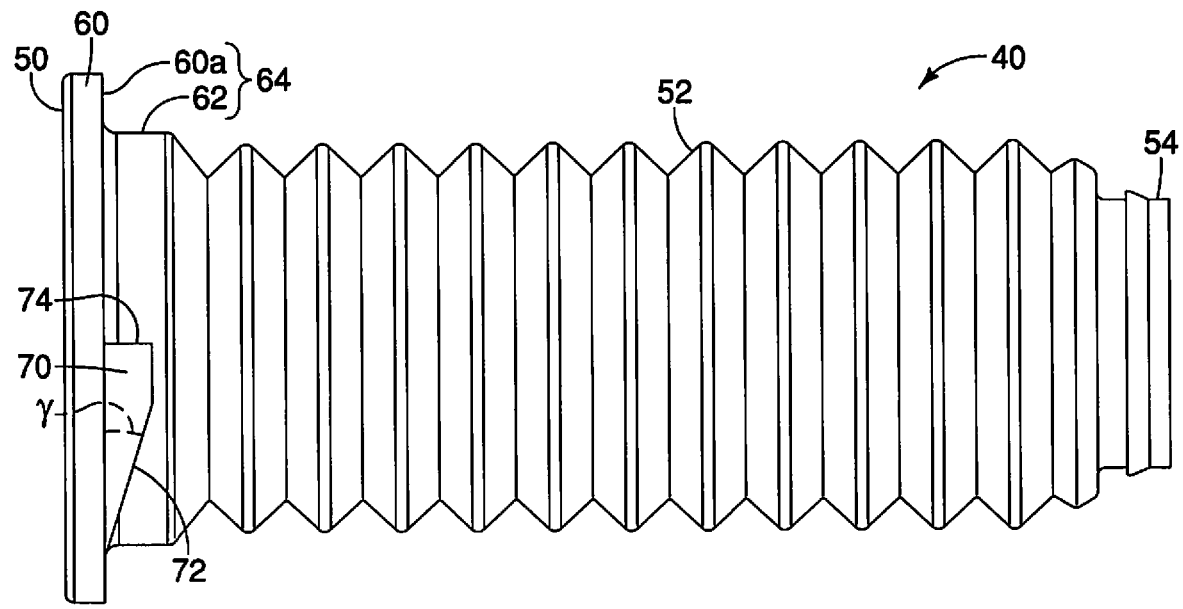
FIG. 9 is a side view of the boot showing the vertical wall and the ramp portion along the vertical wall in accordance with the first embodiment.

As shown in FIG. 2, the strut assembly 12 includes a shock absorber 30, an attachment structure 32, an upper retaining assembly 34, a retaining ring 36, a coil spring 38 and a boot 40.

The shock absorber 30 is installed to the attachment structure 32 in a conventional manner. For example, a lower end (not shown) of the shock absorber 30 can be threadedly attached within a hollow inner portion of the attachment structure 32. A lower end of the attachment structure 32 includes flanges 32a that attached to the steering knuckle 14. The coil spring 38 is disposed between the upper retaining assembly 34 and the retaining ring 36 in a conventional manner with the shock absorber 30 co-axially extending therethrough. The upper retaining assembly 34 is installed to a strut tower (not shown) of the vehicle (not shown) in a conventional manner.

The coil spring 38 has an end section 42 (also referred to as an upper end section 42), a transition section 44, a main section 46 and a lower end section 48. The coil spring 38 is a single, unitary monolithic element that is made of a thick metallic wire material, such as steel. More specifically, the coil spring 38 is an elongated extremely heavy gauge wire that is shaped to form the coils that define the end section 42, the transition section 44, the main section 46 and the lower end section 48. Conventionally, a single loop of a coil spring, such as the coil spring 38, is defined as a portion of the coil spring 38 that extends or spirals around a central axis $A_1$, 360 degrees (a full circle).

The end section 42 defines a spring end face 42a that contacts a portion of the boot 40, as described in greater detail below. As shown in FIG. 2, the end section 42 is defined by a portion of the coil spring 38. The end section 42 of the coil spring 42 does not define a spiral, but rather is shaped such that the spring end face 42a lies within a plane. Further, the end section 42 extends around the central axis $A_1$ with an arcuate length that defines an angle α that is between 200 degrees and 270 degrees when installed to the boot 40 and to the strut assembly 12. Alternatively, the angle α of the end section 42 of the coil spring 38 that extends between 210 degrees and 240 degrees about the central axis $A_1$. Hence, in the depicted embodiments, the end section 42 has an arcuate length (angle α) that is less than a single loop of the coil spring 38 (less than 360 degrees) and is generally planar. Further, the end section 42 of the coil spring 38 defines a first outer diameter $D_1$, as shown in FIG. 2.

The coils of the transition section 44 do not lie within a plane, but rather the coils that define the transition section 44 spiral around the central axis $A_1$ with a gradually increasing outer diameter. The coils of the transition section 44 expand in a downward direction relative to FIG. 2. More specifically, the transition section 44 diverges moving away from the end section 42

The main section 46 continues the spiraling shape of the transition section 44, but spirals around the central axis $A_1$ with a fixed outer diameter $D_2$, as shown in FIG. 2. Hence, the upper end of the transition section 44 spirals downward and away from the end section 42 (defining the outer diameter $D_1$) but diverges (with an expanding outer diameter) until the transition section 44 achieves the outer diameter $D_2$ of the main section 46.

The lower end section 48 is less than a single loop of the coil spring 38 and is planar in order to be securely retained by the attachment structure 32. The lower end section 48 preferably has an outer surface that defines the outer diameter $D_1$, but, can alternatively have a converging diameter that becomes smaller than the outer diameter $D_2$.

A description of the boot 40 is now provided with specific reference to FIGS. 3-9. The boot 40 is positioned within the strut assembly 12 such that it covers and protects upper areas of the shock absorber 30. The boot 40 is a monolithic, unitary element that is molded or otherwise formed as a single unit, with no seams or joint sections, except for a support ring 58 embedded within the boot 40 in a manner that is described further below. The boot 40 is preferably formed of a flexible rubber or rubber-like material such as one of a variety of flexible polymers or flexible resin material.

The boot 40 includes an upper end 50, an extending section 52 and a bottom end 54. The upper end 50, the extending section 52 and the bottom end 54 of the boot 40 encircle and define a central axis of the boot 40. When installed to the strut assembly 12 along with the coil spring 38, the boot 40 is substantially co-axial with the central axis $A_1$. Therefore, for the sake of simplicity, the central axis of the boot 40 is hereinafter also identified as the central axis $A_1$.

The upper end 50 of the boot 40 includes an annular section 60 and a vertical wall 62 that extends downward from the annular section 60. The support ring 58 (a metallic annular shaped member shown in cross-section only in FIG. 5) is embedded within the annular section 60. Except for the support ring 58, the boot 40 is made of one of the above-mentioned materials, and, is substantially homogeneous.

The vertical wall 62 of the boot 40 has an overall cylindrical shape extending completely around the corresponding portion of the boot 40 beneath and adjacent to the annular section 60. The annular section 60 has an annular surface 60a perpendicular to the vertical wall 62, and also adjacent thereto. The annular surface 60a is also referred to as a spring contacting surface 60a. The annular surface 60a and the vertical wall 62 define a spring receiving portion 64.

As shown in FIGS. 3 and 6-8, the vertical wall 62 includes a centering portion 68 and a ramp portion 70. In the depicted embodiment, the centering portion 68 is a substantially rectangular block of material (formed as part of the boot 40) and projects radially outward from the vertical wall 62. However, it should be understood from the drawings and the description herein that the centering portion 68 can also be formed to extend from the vertical wall 62 and/or the annular surface 60a.

Figure 10:
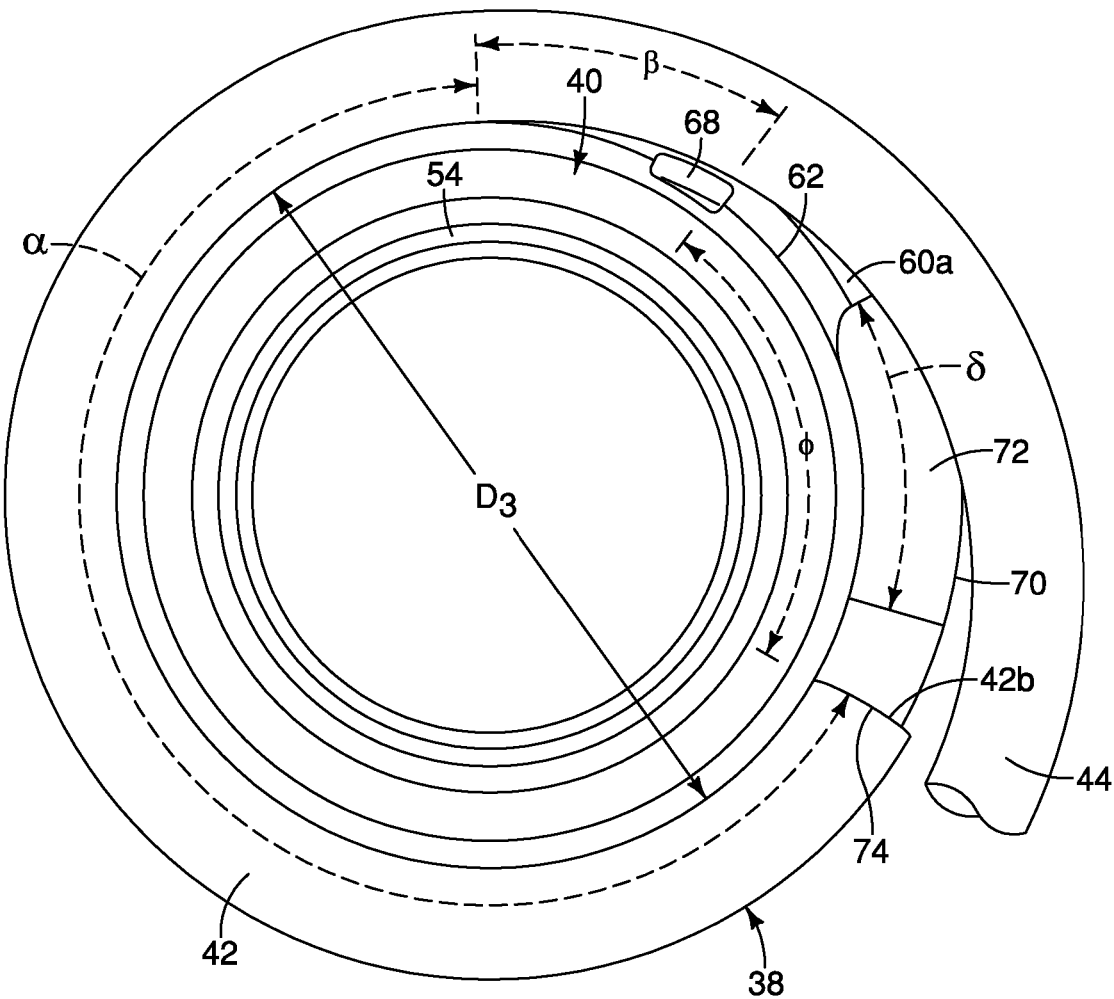
FIG. 10 is a bottom view of the boot with the coil spring installed thereto, showing an end section of the coil spring centered via contact with the vertical wall and the centering portion in accordance with the first embodiment.

The ramp portion 70 is formed along the spring receiving portion 64. The ramp portion 70 includes a ramp surface 72 that defines an acute angle γ relative to the spring contacting surface 60a (annular surface 60a). The ramp portion 70 also defines a stop surface 74 (FIG. 4) that extends in a direction perpendicular to the spring contacting surface 60a and the vertical wall 62. The acute angle γ between 10 and 30 degrees. In the depicted embodiment the acute angle γ is approximately 18 degrees. As shown in FIG. 10, the ramp surface 72 has an arcuate length that defines an acute angle δ relative to the central axis $A_1$ of the boot 40. The angle δ is smaller than the angle φ which is between 60 and 90 degrees. Therefore the angle δ is less than 60 degrees relative to the central axis of the boot. In the depicted embodiment, the angle δ is 45 degrees.

The extending section 52 has an accordion bellows-like shape, such that the extending section 52 is flexible, and easily compressed along the length of the center axis $A_1$ in correspondence with compression of the coil spring 38 and the shock absorber 30. The extending section 52 is also resilient and returns to its original shape after compressive forces applied to the boot 40 are released. The bottom end 54 of the boot 40 is shaped and dimensioned to install to an annular ring 32a formed or fixed to the attachment structure 32 thereby covering the exposed portions of the shock absorber 30 above the annular ring 32a.

Figure 11:
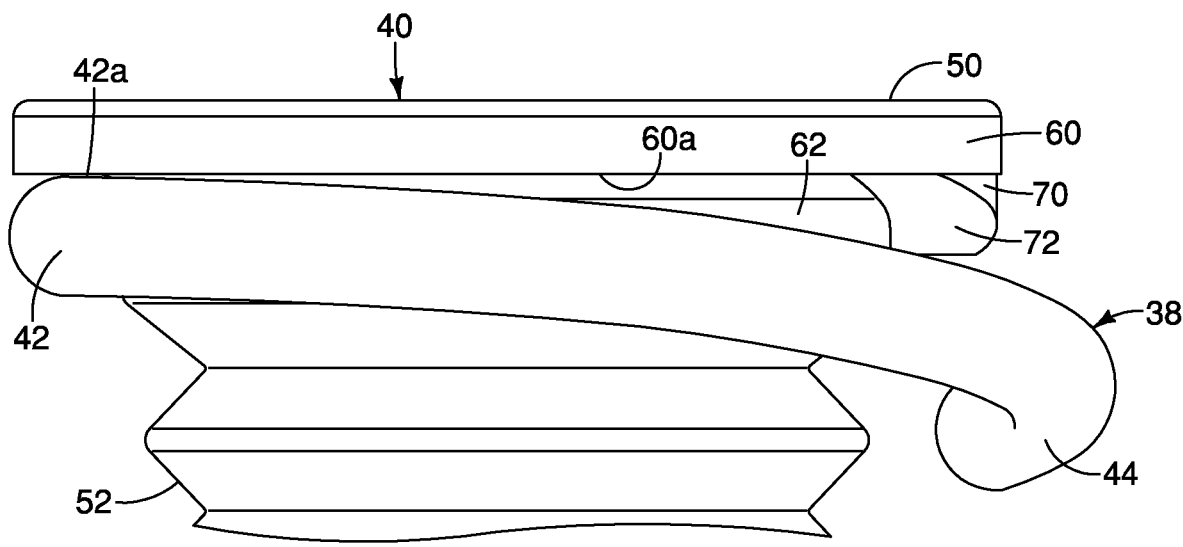
FIG. 11 is a side view of the boot with the coil spring installed thereto, showing the end section of the coil spring contacting the annular surface of the annular section in accordance with the first embodiment.

The upper end 50 of the boot 40 (described further below) is confined between the upper retaining assembly 34 and the coil spring 38. As shown in FIGS. 10 and 11, the end section 42 (upper end section) is fitted against the annular surface 60a. During normal operation of the strut assembly 12, the end section 42 of the coil spring 38 presses against the annular surface 60a. As shown in FIG. 10, the end section 42 wraps partway around the vertical wall 62 as indicated by the angle γ. As shown in FIG. 10, during installation, the spring end 42b is placed adjacent to and contacts the stop surface 74 of the ramp portion 70 of the upper end 50 of the boot 40.

The contact between the spring end 42b and the stop surface 74 of the ramp portion 70 of the upper end 50 of the boot 40, prevents rotation of the coil spring 38 relative to the boot 40. Further, the contact between the end section 42 of the coil spring 38 and the vertical wall 62 centers the coil spring 38 relative to the boot 40.

As shown in FIG. 10, the centering portion 68 is positioned and dimensioned such that the centering portion 68 contacts an area of the transition section 44 of the coil spring 38, preventing the coil spring 38 from moving to an off-center position relative to the boot 40 and the central axis $A_1$. As discussed above, the transition section 44 has an increasing outer diameter moving away from the end section 42 of the coil spring 38. The centering portion 38 is dimensioned to account for the changing outer diameter of the transition section 44 of the coil spring 38.

As shown in FIG. 10, an inner diameter $D_3$ of the end section 42 of the coil spring 38 is equal to, or substantially equal to the outer diameter of the vertical wall 62, Further, a portion of the transition section 44 is located adjacent to and radially outward from the stop surface 74.

As shown in FIG. 11, the ramp portion 70 and the ramp surface 72 of the spring receiving portion 64 are dimensioned such that a portion of the transition section 44 of the coil spring 38 extends under the ramp surface 72. When the coil spring 38 is compressed, the transition section 44 contacts the ramp surface 72 further ensuring that the coil spring 38 remains centered about the central axis $A_1$.

The centering portion 68 contacts the transition section 44 at an area that is spaced apart from the end section by an angle β that is between 10 and 30 degrees. Further, the centering portion 68 is spaced apart from the stop surface 74 by an angle φ that is between 60 degrees and 90 degrees.

Second Embodiment

Figure 12:
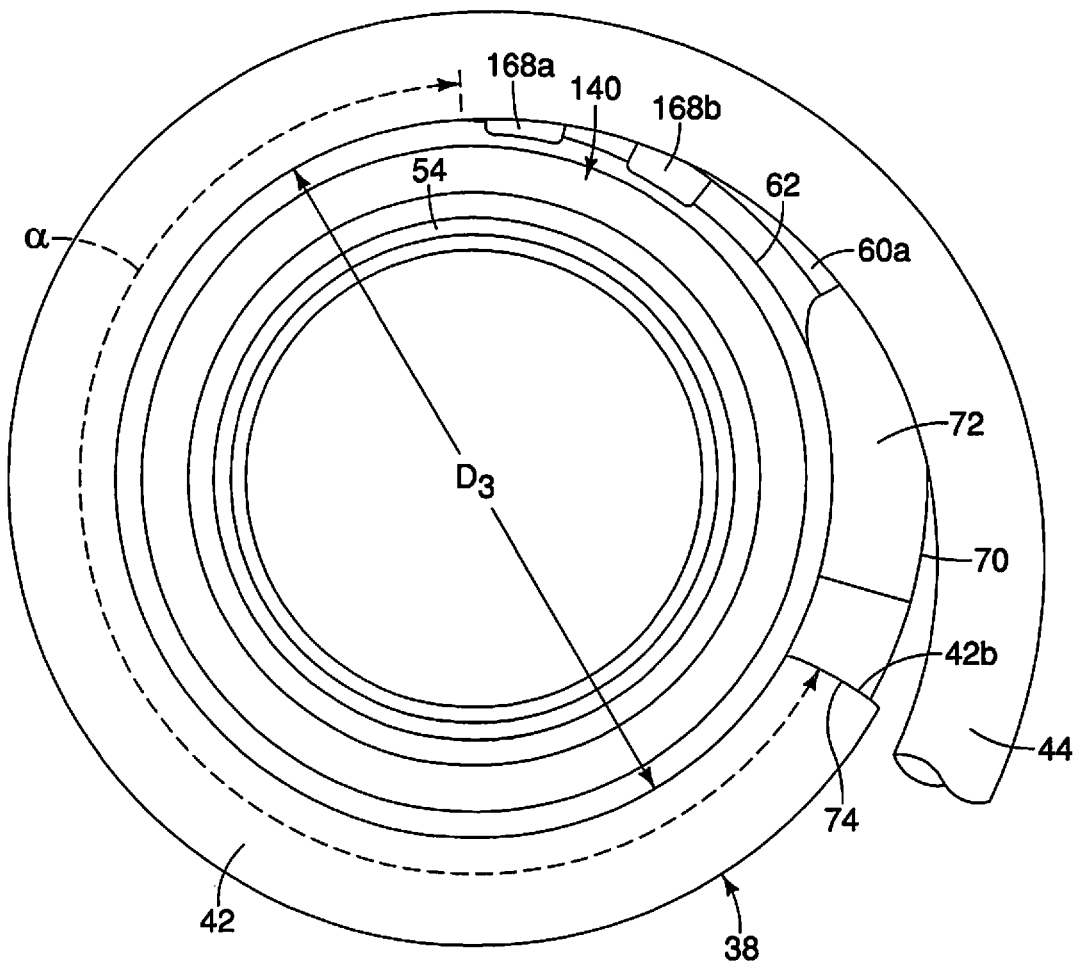
FIG. 12 is a bottom view of a boot with the coil spring installed thereto, showing an end section of the coil spring centered via contact with the vertical wall and a pair of centering portions in accordance with a second embodiment.

Referring now to FIG. 12, a boot 140 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The boot 140 has all of the features of the boot 40 depicted in FIGS. 1-11, except that the single centering portion 68 is replaced with a plurality of centering portions. Specifically, the boot 140 includes a first centering portion 1688 and a second centering portion 168b, that is larger than the first centering portion 168a. Specifically, the first centering portion 168a (a first projection) extends a first distance away from the vertical wall 62 and the second centering portion 168b (a second projection) extending a second distance away from the vertical wall 62, with the second distance being greater than the first distance. More specifically, the first and second centering portions 168a and 168b are dimensioned to contact the transition section 44 of the coil spring 38 in order to maintain the coil spring 38 in a centered position relative to the center axis $A_1$.

The various elements and components of the strut assembly 12 other than the boot 40 are conventional suspension components that are well known in the art. Since suspension components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle strut assembly. Accordingly, these terms, as utilized to describe the present invention should be interpreted relative to a vehicle equipped with the vehicle strut assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A strut assembly, comprising,
a boot having an upper end and an extending section having an accordion bellows-like shape extending downward from the upper end defining a central axis extending therethrough, the upper end having a vertical wall, a spring receiving contact surface and a centering portion, the vertical wall and the spring receiving contact surface at least partially defining a spring receiving portion, the spring receiving contact surface having a portion thereof that is planar with an annular disc shape perpendicular to the vertical wall that extends radially outward from the vertical wall, the centering portion projecting from the vertical wall of the spring receiving portion, the spring receiving portion including a ramp portion that extends in a radially outward direction and from the spring receiving contact surface, the ramp portion having a ramp surface defining an acute angle relative to the spring receiving contacting surface, the ramp portion defining a stop surface perpendicular to the spring contacting surface and the vertical wall, the ramp surface having a length that is defined by an angle that is less than 60 degrees relative to the central axis of the boot, the boot being formed as a monolithic, unitary element as a single unit; and a coil spring having an end section, a transition section and a main section, the end section being fitted to the spring receiving portion encircling at least a portion of the vertical wall and defining a first radially inner diameter, the transition section having an increasing inner diameter extending from the end section to the main section, and the main section defining a second radially inner diameter greater than the first radially inner diameter, the centering portion being positioned to contact a radially inner surface of the transition section of the coil spring restricting movement of the end section of the coil spring relative to the spring receiving portion of the boot, the coil spring defining a central axis extending therethrough that coincides with the central axis of the boot.

2. The strut assembly according to claim 1, wherein the vertical wall has an overall cylindrical shape.

3. The strut assembly according to claim 1, wherein the end section of the coil spring includes a spring end face that contacts the stop surface with the coil spring installed to the boot.

4. The strut assembly according to claim 1, wherein the end section of the coil spring extends between 200 degrees and 270 degrees about the central axis when installed to the boot.

5. The strut assembly according to claim 4, wherein the end section of the coil spring extends between 210 degrees and 240 degrees about the central axis when installed to the boot.

6. The strut assembly according to claim 5, wherein the end section of the coil spring overlies the spring receiving portion when installed to the boot.

7. The strut assembly according to claim 5, wherein the spring receiving portion includes a ramp portion having a ramp surface that defines an acute angle relative to the spring contacting surface, the ramp portion defining a stop surface perpendicular to the spring contacting surface and the vertical wall.

8. The strut assembly according to claim 7, wherein the transition section of the coil spring diverges away from the spring receiving portion and diverges away from the annular surface extending from the end section of the coil spring.

9. The strut assembly according to claim 8, wherein the centering portion contacts the transition section at an area that is spaced apart from the end section by an angle that is between 10 and 30 degrees.

10. The strut assembly according to claim 8, wherein the transition section diverges away from the spring receiving portion moving away from the end portion such that a section of the transition section is located adjacent to and radially outward from the stop surface.

11. The strut assembly according to claim 10, wherein the centering portion is spaced apart from the stop surface by an angle of between 60 degrees and 90 degrees.

12. The strut assembly according to claim 1, wherein the end section of the coil spring and the vertical wall define a first gap therebetween, and a portion of the transition section adjacent to the centering portion and the vertical wall defines a second gap therebetween, the second gap being greater than the first gap.

13. The strut assembly according to claim 1, wherein the centering portion is a rectangular projection located radially outward of the vertical wall.

14. The strut assembly according to claim 1, wherein the centering portion comprises a plurality of rectangular projections located radially outward of the vertical wall.

15. The strut assembly according to claim 14, wherein the plurality of rectangular projections includes a first projection extending a first distance away from the vertical wall and a second projection extending a second distance away from the vertical wall, the second distance being greater than the first distance.

16. The strut assembly according to claim 1, wherein the ramp surface of the ramp portion of the spring receiving portion is dimensioned such that a portion of the transition section of the coil spring extends under the ramp surface and is spaced apart from the ramp surface, except that when the coil spring is compressed, the transition section contacts the ramp surface.

17. The strut assembly according to claim 7, wherein the ramp surface of the ramp portion of the spring receiving portion is dimensioned such that a portion of the transition section of the coil spring extends under the ramp surface and is spaced apart from the ramp surface, except that when the coil spring is compressed, the transition section contacts the ramp surface.

18. The strut assembly according to claim 1, wherein the angle defined by ramp surface relative to the central axis of the boot is 45 degrees.

* * * * *